United States Patent [19]

Perkins

[11] Patent Number: 5,649,679
[45] Date of Patent: Jul. 22, 1997

[54] AIRPLANE NOSE-WHEEL FAIRING COVER

[76] Inventor: Mark Perkins, 7330 E. Palo Verde Dr., #15, Scottsdale, Ariz. 85250

[21] Appl. No.: 342,357

[22] Filed: Nov. 18, 1994

[51] Int. Cl.[6] .................. B64C 1/14; B64C 25/36; B65D 65/02
[52] U.S. Cl. ................ 244/121; 244/103 R; 150/166
[58] Field of Search ............... 244/121, 100 R, 244/129.2, 103; 206/304, 304.1, 304.2; 150/166

[56] References Cited

U.S. PATENT DOCUMENTS

| D. 270,152 | 8/1983 | Dale | 249/100 R |
|---|---|---|---|
| 1,409,666 | 3/1922 | Calise . | |
| 1,504,907 | 8/1924 | Sandusky . | |
| 1,557,943 | 10/1925 | Musto . | |
| 1,965,527 | 12/1934 | Lyon . | |
| 1,991,207 | 6/1935 | Hartel . | |
| 2,107,783 | 2/1938 | Frey . | |
| 2,849,045 | 8/1958 | Anderson . | |
| 3,106,374 | 10/1963 | Olson et al. | 244/121 |
| 4,027,835 | 6/1977 | Sachs | 244/101 |
| 4,126,169 | 11/1978 | Magnuson | 150/54 |
| 4,598,883 | 7/1986 | Suter | 150/166 |
| 4,606,516 | 8/1986 | Willison | 244/121 |
| 5,058,914 | 10/1991 | Murcheson | 150/166 |
| 5,115,848 | 5/1992 | Malone | 150/166 |
| 5,143,321 | 9/1992 | Jackson | 244/121 |
| 5,255,875 | 10/1993 | Maglieri | 244/121 |
| 5,273,316 | 12/1993 | Infante | 150/166 |
| 5,318,251 | 6/1994 | Bergh | 244/121 |
| 5,458,945 | 10/1995 | Tall | 150/166 |

Primary Examiner—Andres Kashnikow
Assistant Examiner—Virna Lissi Mojica
Attorney, Agent, or Firm—Donald J. Lisa

[57] ABSTRACT

The present invention relates to a protective cover for an airplane nose-wheel fairing. The protective cover prevents a nose-wheel fairing from becoming cracked or scratched as an airplane tow bar is attached or removed from the nose-wheel strut.

10 Claims, 3 Drawing Sheets

AIRPLANE NOSE-WHEEL FAIRING COVER

FIELD OF THE INVENTION

The present invention relates to a cover for the nose-wheel fairing (or fender) of an airplane. The cover protects the nose-wheel fairing from outside forces, and prevents cracking and chipping of the fairing.

BACKGROUND OF THE INVENTION

The nose-wheel of an airplane is the front wheel of the plane. Ordinarily, the nose-wheel is surrounded by a nose-wheel fairing, commonly constructed of fiberglass or metal, which prevents the wheel from kicking up water and debris onto the plane and also adds an aesthetic quality to the plane. Additionally, wheel fairings are conically shaped as to disperse the air around the plane wheel and enhance the aerodynamic flow of a plane. The nose-wheel is connected to the body of the plane via a nose strut, which acts to absorb shock during landing of the plane. An example of a wheel cover in the prior art is shown in U.S. Pat. No. D270,152.

On the ground, planes are commonly moved from place to place. When a plane is towed or moved around an airport or landing strip, a tow bar is used. The tow bar may be either a manual tow bar (i.e., one that is pushed or pulled manually), or a tow bar connected to a vehicle for pushing or pulling a plane. The tow bar is most commonly connected to the front nose-wheel of the plane being moved, and more specifically to the nose strut connecting the nose-wheel to the plane body.

As a tow bar is used, and during the normal attaching and removing of the tow bar, often times the bar is dropped on or dragged across the nose-wheel fairing covering the nose-wheel of a plane being moved. Because the tow bar is made of heavy duty material, this often results in cracking or scratching of the nose-wheel fairing. This not only negatively affects the visual appearance of the plane, but may also interfere with the aerodynamics of the plane during flight.

Accordingly, an object of the present invention is to provide a cover for a nose-wheel fairing on a plane to protect said fairing from damages from external sources.

Additionally, it is a further object of the present invention to provide a removable cover for a nose-wheel fairing of a plane, said cover to provide protection from a tow bar.

SUMMARY OF THE INVENTION

In accordance with these and other objects of the present invention, a protective cover is provided, said cover made to conform to the shape of an airplane nose-wheel fairing. The protective cover may be comprised of a rigid material such as fiberglass or plastic, or may be comprised of a flexible material such as leather or vinyl. The protective cover is comprised in a way to permit application of the cover upon landing and prior to attachment of a tow bar, and easy removal of the cover prior to taking off.

Once the protective cover is attached to the nose-wheel fairing, a tow bar may be attached to a nose strut without fear of scratching or cracking the nose-wheel fairing if the tow bar is dropped on said fairing.

DETAILED DESCRIPTION OF THE INVENTION

Figure 1:
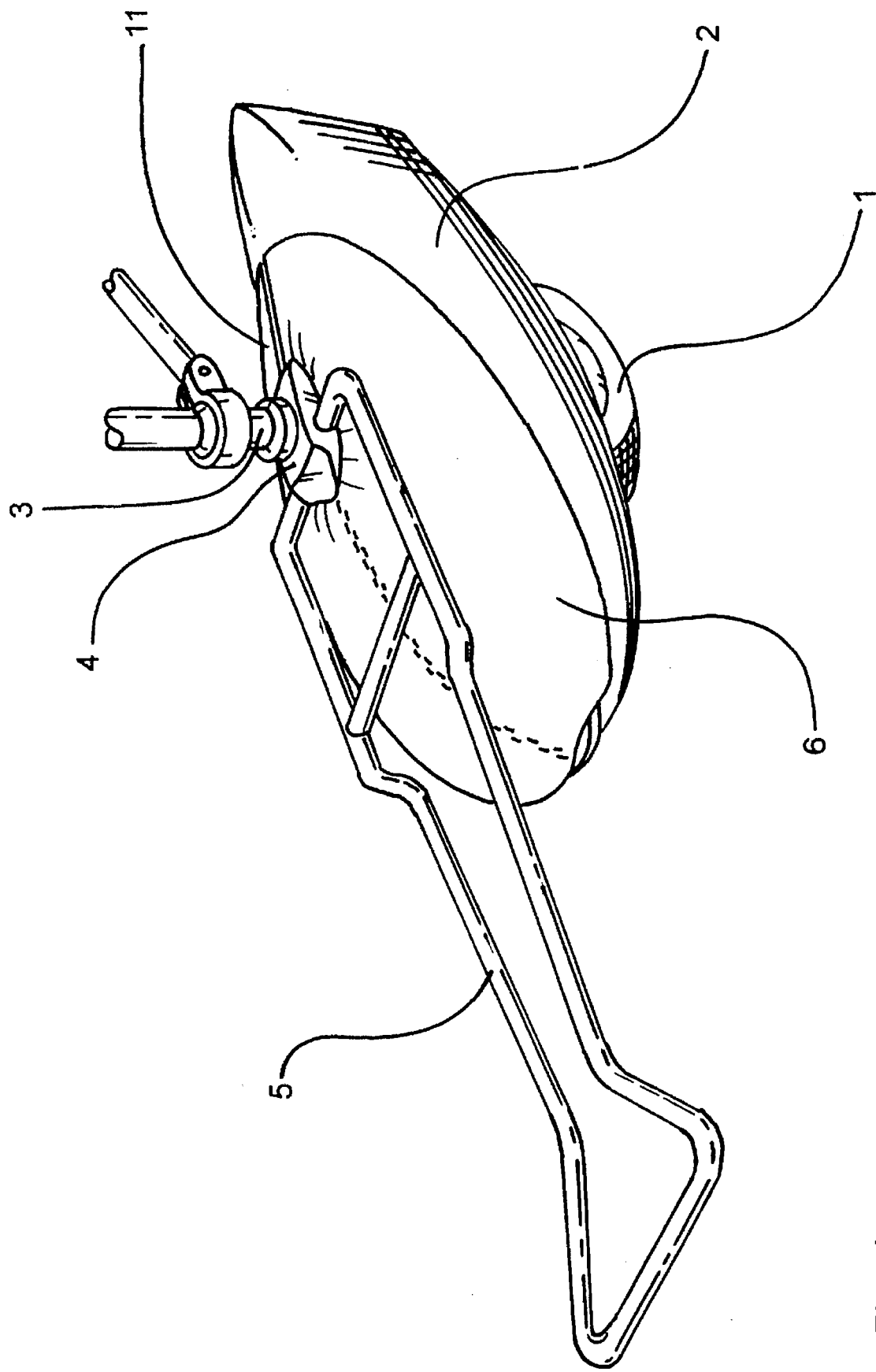
FIG. 1 shows a tow bar attached to the nose-wheel strut just above the airplane nose-wheel fender or fairing.
Figure 1A:
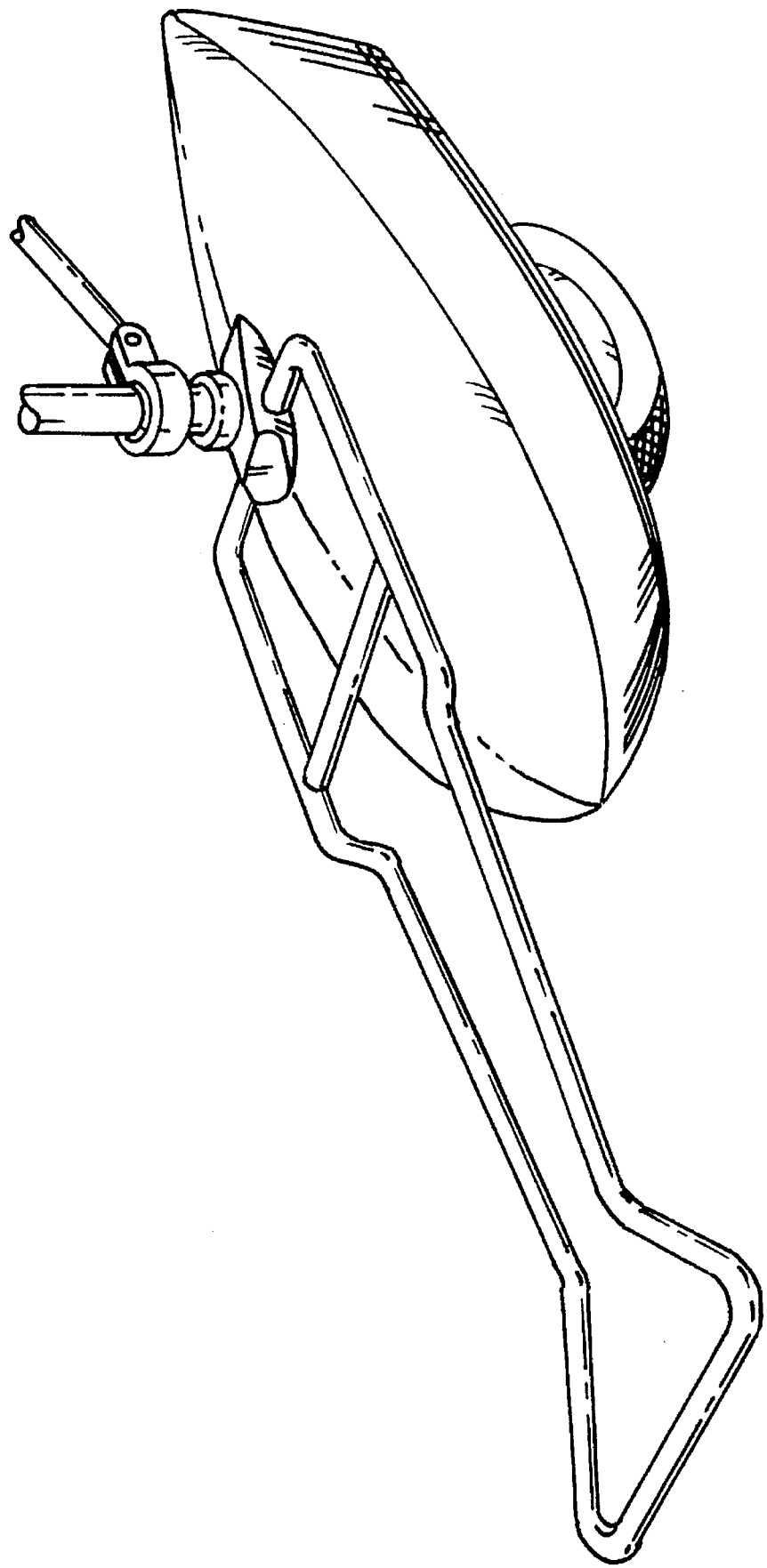
FIG. 1A is a perspective view showing a nose wheel fairing of the prior art with tow bar attached to the nose wheel strut above the fairing.

The present invention relates to a protective cover for the nose-wheel fairing of an airplane. The nose-wheel 1 of an airplane is the front or first wheel of a plane, looking at an airplane from the front (cockpit) to back (tail). Nose-wheel 1 is usually covered by a fender or fairing 2 as shown in FIG. 1. Nose-wheel fairing 2 is commonly comprised of fiberglass, and may be made of other material such as plastic or metals. Nose-wheel fairing 2 increases the aerodynamics of an airplane by reducing drag caused by the nose-wheel, as well as preventing water and dirt from being kicked up by the moving wheel.

Nose-wheel 1 is attached to the underside of an airplane via nose-wheel strut 3. Nose-wheel strut 3 is secured and stabilized by an attachment 4 to nose-wheel fairing 2.

Oftentimes, an airplane is moved around the ground of an airport. This is commonly accomplished using a tow bar 5. Tow bar 5 is usually attached to nose-wheel strut 3. Once tow bar 5 is attached, the airplane is easily rolled from place to place.

Tow bar 5 may be one which is manually pushed and pulled, or may be one which is attached to a motor vehicle to push and pull an airplane. Tow bar 5 in FIG. 1 is a manual type tow bar.

As tow bar 5 is attached and removed from nose-wheel strut 3, tow bar 5 is commonly dropped on or dragged across nose-wheel fairing 2. As a result, nose-wheel fairing 2 becomes scratched and/or cracked. Such scratches or cracks take away from the beauty of any plane, detract from an airplanes value, and, most importantly, interfere with the aerodynamics of an airplane during flight.

Figure 2:
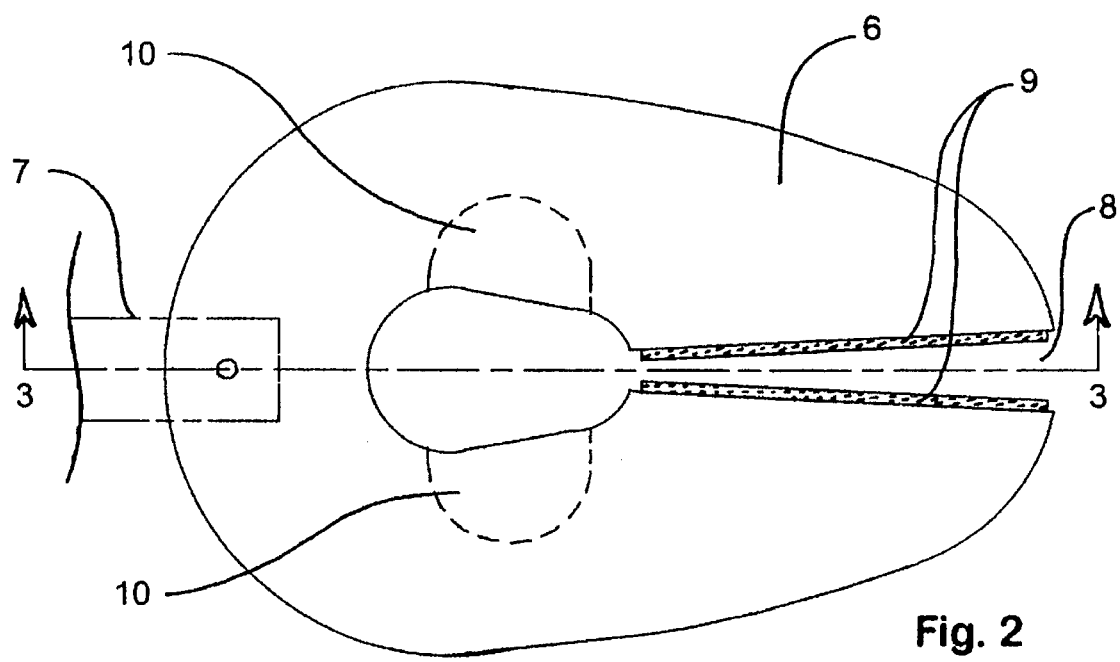
FIG. 2 shows a top view of a protective cover of the present invention laid flat on the ground.
Figure 3:
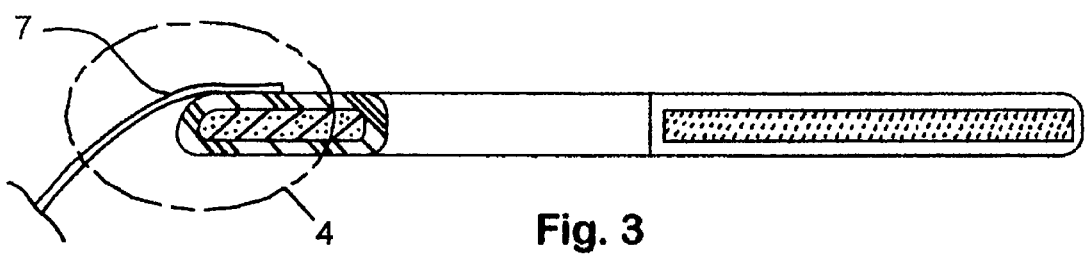
FIG. 3 shows a cross section of a protective cover of the present invention.

A protective fairing cover 6 of the present invention prevents damage to nose-wheel fairing 2 during attachment and removal of tow bar 5. As shown in FIG. 2, protective cover 6 is formed in a shape to conform to and cover nose-wheel fairing 2. Open end 8 of cover 6 slides over and fits around nose-wheel strut 3, and attaches securely along sides 9. Cover 6 may be secured along sides 9 by any securing means such as, but not limited to, VELCRO, snaps, straps, buttons, clips, or a zipper.

Cover 6 is comprised of any material strong enough to withstand the force of having tow bar 5 dropped thereon, and not crack, rip or tear. Such material may be, but is not limited to, a rigid material such as plastic, fiberglass, or metal. If cover 6 is comprised of a rigid material, a hinge would be provided along the what is shown as line 3 in FIG. 2, so as to permit the attachment and removal of cover 6 around nose-wheel strut 3. Alternatively, cover 6 may be comprised of a flexible material such as, but not limited to, leather, vinyl, vinyl/polyester blend, acrylic, rubber, neoprene, or cloth, or any combination thereof. Additionally, a foam backing may be supplied to cover 6 to add extra protection to the nose-wheel fairing. For the practice of the present invention, a flexible material is preferred over a rigid material.

Although it is not required, cover 6 may be comprised of a material that is flame retardant. Moreover, a material that is treated for UV protection may be utilized to reduce color fading from sunlight.

As shown in FIG. 1, protective cover 6 is laid over nose-wheel fairing 2 and securely attached in the back at point 11. Once protective cover 6 is attached, tow bar 5 may be attached and removed without any damage to nose-wheel fairing 2. In one embodiment of the present invention, protective cover 6 may also be provided with reinforcement regions 10 midway in cover 6, said regions 10 corresponding to the points at which tow bar 5 is attached to an airplane. It is at these points that tow bar 5 will most often be dropped, and therefore reinforcement regions 10 provide an additional amount of protection to nose-wheel fairing 2.

Additionally, protective cover 6 may also be provided with warning tag 7 attached towards the front of cover 6. Warning tag 7 may be of any type of material. Preferably, warning tag 7 is made of a bright color so to be noticeable by the pilot. Written on warning tag 7 may be the words "WARNING: REMOVE BEFORE FLIGHT". Additionally, warning tag 7 may be comprised of a material that is flame retardant. It is important that cover 6 be removed before flight so as to not interfere with the aerodynamics of the plane.

Figure 4:
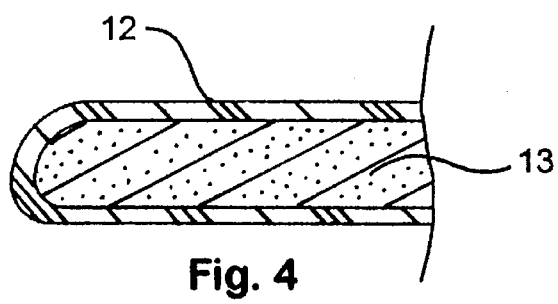
FIG. 4 shows a cross section of one embodiment of a protective cover of the present invention.
Figure 5:
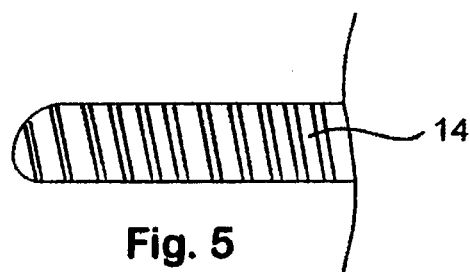
FIG. 5 shows a cross section of one embodiment of a protective cover of the present invention.
Figure 6:
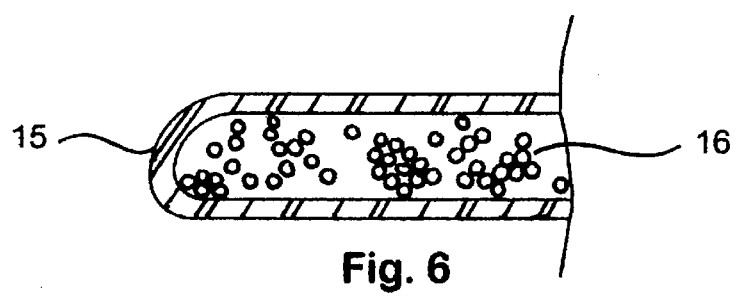
FIG. 6 shows a cross section of one embodiment of a protective cover of the present invention.

As discussed above, protective cover 6 may be comprised of any material strong enough to withstand the force of tow bar 5 being dropped thereupon. As shown in FIG. 4, cover 6 may be comprised of a vinyl outside 12 with a flexible rubber or foam 13 inside. A vinyl/polyester blend may also be utilized for cover 6 either alone, or with a foam inside as shown in FIG. 4. Alternatively, as shown in FIG. 5, cover 6 may be comprised entirely of semi-rigid rubber or neoprene. Finally, as shown in FIG. 6, cover 6 may be comprised of a vinyl outside 15 enclosing pellets 16 (similar to a bean bag), wherein pellets 16 may be styrofoam, cork, rubber, or any other semirigid material. These examples are by no means exhaustive. Additionally, reinforcement regions 10 may be comprised of any material to give extra support around the regions most commonly in contact with tow bar 5. Regions 10 may be comprised of, but is not limited to, an extra layer of vinyl, a layer of rubber, or even leather.

The invention has been described in detail with particular reference to a preferred embodiment thereof, but it will be understood that the invention is capable of other and different embodiments. As is readily apparent to those skilled in the art, variations and modifications can be affected within the spirit and scope of the invention. Accordingly, the foregoing disclosure, description, and figures are for illustrative purposes only, and do not in any way limit the invention, which is defined only by the claims.

I claim:

1. A protective cover for a nose-wheel fairing of an airplane, said protective cover capable of fitting over and forming to the shape of said nose-wheel fairing the fairing having an outer upper surface, and the cover having an inner surface a major portion of which is in overlying contact with the outer surface of the fairing.

2. The protective cover of claim 1 comprised of a material selected from the group consisting of fiberglass, plastic, and metal.

3. The protective cover of claim 1 comprised of a material selected from the group consisting of leather, vinyl, vinyl/polyester blend, acrylic, rubber, neoprene, nylon, rayon, and cotton.

4. The protective cover of claim 1 further comprised of a warning tag attached to said protective cover signifying that said protective cover should be removed prior to flight.

5. The protective cover of claim 3 further comprised of a material that is flame retardant.

6. The protective cover of claim 2 further comprising:

The cover formed as two halves hinged together at the front end.

7. The protective cover of claim 1 further comprising:

the nose wheel fairing secured to the nose wheel strut, the cover having a slitted rear end for passing the nose wheel strut therebetween when being applied to the fairing, and an attacher for releaseably securing the slitted end.

8. The protective cover of claim 7 wherein the attacher is selected from the group consisting of a hook and loop mechanism, snaps, straps, buttons, clips, and zipper.

9. The protective cover of claim 7 further comprising:

the slitted end having inboard ends on each side thereof secured snugly against the strut thereby holding the front end of the cover snugly against the front underside of the fairing thereby preventing the cover from being dislodged in use.

10. The protective covering of claim 7 further comprising reinforcements in the area adjacent the strut when the strut is received through the slitted end.

* * * * *